Dec. 29, 1953     A. R. STEPHANY     2,664,261
SILENT VALVE
Filed Jan. 3, 1947
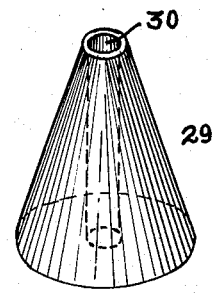
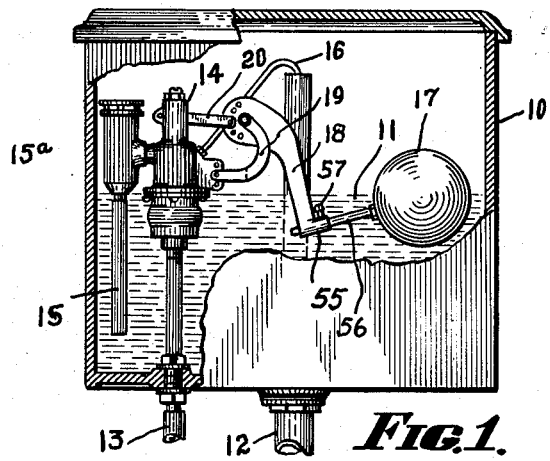
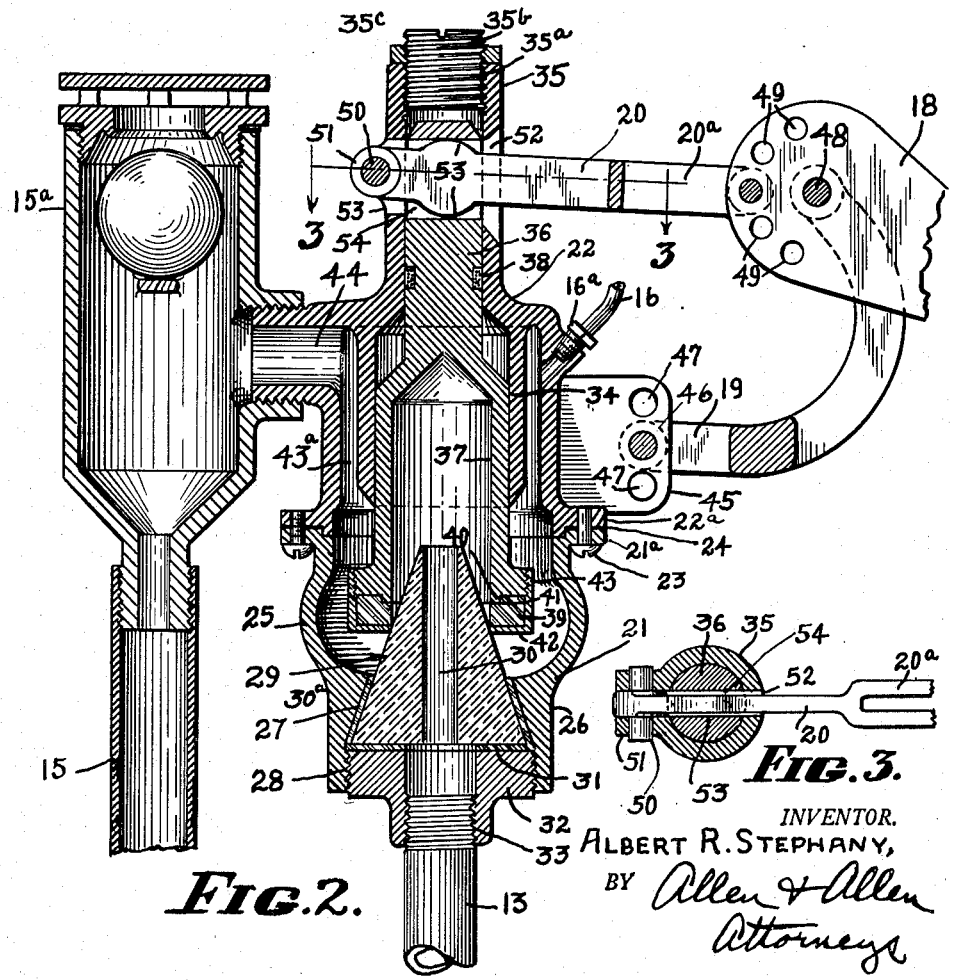
INVENTOR.
ALBERT R. STEPHANY,
BY Allen & Allen
Attorneys Patented Dec. 29, 1953

2,664,261

UNITED STATES PATENT OFFICE 2,664,261

SILENT VALVE

Albert R. Stephany, Newport, Ky.

Application January 3, 1947, Serial No. 719,989

5 Claims. (Cl. 251—27)

1

This invention relates to a silent valve capable of use in various installations, but particularly adapted for use in connection with water closets.

Reference is made to my co-pending application Serial No. 646,004, filed February 7, 1946, since abandoned, in which a new type of silent valve is disclosed and claimed.

It is an object of the present invention to provide a valve of the general type outlined in my co-pending case, but being in a number of respects an improvement on said valve. It is another object of my invention to provide a valve of the type outlined which is still more silent than the valve discussed above and which is less likely to require servicing or cleaning.

These and other objects of my invention which will be set forth hereinafter or which will appear to one skilled in the art as the description proceeds I accomplish by that certain construction and arrangement of parts of which I shall now describe an exemplary embodiment.

Reference is made to the drawings forming a part hereof and in which Figure 1 is an elevational view of a water closet storage tank with the casing broken away to show the construction.

Figure 2 is a vertical cross-sectional view through the valve and associated parts on a greatly enlarged scale.

Figure 3 is a detailed cross-sectional view taken on the line 3, 3 of Figure 2.

Figure 4 is a perspective view of the nozzle element.

In Figure 1 I have shown a water closet storage tank generally at 10 in which there is stored a volume of water 11 adapted to be delivered to the bowl through an outlet 12 as is well-known in the art. Also conventionally an inlet or supply line is shown at 13 for delivery of water to the tank 10. The float actuated valve is generally indicated by the numeral 14 and is provided with a delivery pipe 15 extending to near the bottom of the storage tank. A non-siphoning attachment may be provided as at 15a as is required by law in certain States; but the member 15a forming no part of my invention will not be described in detail. A conventional after-fill tube is indicated at 16 and the valve is actuated by movement of the ball float 17 through a linkage indicated generally at 18, 19 and 20.

Referring now more particularly to Figure 2 the valve chamber is preferably made in two parts indicated generally at 21 and 22. The two parts are provided with the fastening flanges 21a and 22a respectively which are fastened together by means of screws 23 with a gasket 24 between them.

2

The lower half of the casing 21 is provided with a rounded cavity 25 and at its lower end in the boss 26 it has a conical aperture 27 which merges into a threaded opening 28. A conical nozzle element is indicated at 29 having a central bore 30, and the member 29 is preferably made of glass. It may also be made of any suitable ceramic material having a glazed or glass-like surface and it will be understood that the term "glass" in the claims is used to include materials having a glassy surface.

A conical washer 30a which may be of rubber is placed in the aperture 27 to provide a seat for the member 29. Another rubber washer 31 is placed against the bottom of the member 29 and the nozzle and washers are held in place by means of a fitting 32 which is threaded into the threaded portion 28 and which in turn has a threaded aperture 33 to receive the threaded end of the supply line 13.

The upper portion 22 of the valve has a bearing portion 34 and a guide extension 35. The valve element proper has a guide or stem portion 36 adapted to reciprocate within the portion 35 and a silencing chamber 37 having an exterior diameter to fit snugly within the portion 34. A packing is preferably provided as at 38. The end of the portion 35 is threaded internally at 35a to receive the threaded plug 35b. The plug 35b is provided with a screw driver slot as shown, and is held in adjusted position by means of the lock unit 35c. Adjustment of the plug 35b determines the extent to which the valve can open, and is done on the basis of the water pressure at the particular installation. With high pressures the movement of the valve is restricted to bring about more silent operation. At the lower end of the silencing chamber I provide a rubber washer 39 which is preferably counter-bored as at 40 for engagement behind the annular lip 41 of the chamber 37. The washer 39 is held in place by means of a cap 42 which is threaded onto the bottom of the member 37 as at 43. It will be noted that when the valve is closed as in Figure 2 only the relatively sharp edge of the washer 39 contacts the glass nozzle, so that the contact between the washer and the nozzle is actually a line running around the nozzle.

Exteriorly of the portion 34 I provide an annular chamber 43a communicating with the outlet 44 which comunicates with the antisiphoning device 15a and the delivery tube 15. The afterfill tube 16 communicates with the chamber 43 by means of a fitting 16a which may be threaded into the member 22 as at 16b.

The member 22 is provided with a bracket portion 45 to which the curved arm 19 is pivoted as at 46. It will be noted that additional holes 47 are provided in the bracket 45 so that the leverage of the float may be adjusted in accordance with local requirements.

The arm 18 is pivoted to the arm 19 as at 48 which is provided with a series of holes 49. The fork 20a of the lever 20 is pivoted to one of the holes 49 of the member 18 depending upon the leverage desired. The other end of the arm 20 is pivoted as at 50 to a boss 51 extending from the portion 35. The extension 35 is slotted as at 52 and 53 to permit pivotal movement of the arm 20. The arm 20 is provided with the central bearing surface 53 which rides in a slot 54 in the member 36.

It will be clear from the foregoing description that as the lever 20 is moved up and down by the action of the float valve the member 36 will be raised and lowered in the guide 35 thus opening and closing the valve.

The other end of the lever 18 has the drilled boss 55 in which the rod 56, on which the ball 17 is carried, is fastened by means of a screw 57. It will be clear that the three holes 47 in the bracket 45 and the holes 49 in the lever 18 give considerable range of adjustment to the linkage connecting the ball float valve with the valve operating lever 20.

The operation of the valve will be clear from the foregoing description. When the level of the water 11 at the storage tank 10 drops carrying with it the float ball, the valve member 36 is raised and water flows through the line 13, the nozzle 29, the silencing chamber 37, the chamber 25 and the annular chamber 43 to the delivery port 44. As the level of water in the storage tank is restored thus raising the float, the member 36 is gradually lowered until the washer 39 contacts the nozzle 29 closing the valve. It will be noted that the valve body will at all times remain full of water so that when the valve is opened, the operation is silent because water coming through the nozzle 29 comes in contact with water already in the chamber 37 and this in turn contacts the water already in the chamber 25.

In conventional water closets adjustment of the system is accomplished by bending the rod carrying the ball float. It will be clear that with an arrangement as shown in the drawings, this adjustment is accomplished by selection of the appropriate holes 47 and 49.

It will be understood that many modifications may be made without departing from the spirit of my invention and I do not intend to limit myself except as pointed out in the claims which follow:

Having now fully described my invention what I claim as new and desire to secure by Letters Patent is:

1. A fluid valve comprising upper and lower casing parts, said parts being provided with fastening flanges, said lower part constituting a chamber open at the top and having an opening in the bottom, the orifice of said opening being threaded to receive a fitting and said opening from said threaded portion to the interior being conical, a conical nozzle element of glass seated in said conical opening and extending into said chamber, and a fitting engaging said threaded portion to hold said nozzle element in place; said upper part comprising a chamber having an outlet, a valve guide extending downwardly in said chamber, and a valve element in said guide, said valve element comprising a cylinder open at the bottom and carrying a nozzle engaging washer, said valve element being at all times substantially full of fluid when said valve is operatively connected to a fluid supply source, said upper part having a bearing extension, and said valve having a stem arranged to have a sliding bearing in said bearing extension.

2. A valve according to claim 1, in which said washer has a relatively sharp nozzle engaging edge, whereby said valve is closed by substantially line contact between said washer and said nozzle.

3. A valve according to claim 1, in which an adjusting plug is provided in the end of said bearing extension for limiting the degree of opening of said valve.

4. A fluid valve comprising a chamber having an outlet, a conical aperture in said chamber terminating in a threaded bore, a conical washer in said bore, a conical nozzle element of glass seated in said aperture against said conical washer, and held in place by a fitting threaded into said bore, with a washer against the base of said nozzle element, said nozzle element projecting into said chamber, a fluid inlet through said nozzle element, a valve element comprising a silencing chamber open at one end, said opening being cylindrical and of a size to seat against said nozzle element intermediate the top and bottom thereof in substantially annular line contact, and means for actuating said valve element.

5. A fluid valve comprising a chamber having an outlet, a conical nozzle element of glass projecting into said chamber, a fluid inlet through said nozzle element, a valve element comprising a silencing chamber open at one end, said opening being cylindrical and of a size to seat against said nozzle element intermediate the top and bottom thereof in substantially annular line contact, said valve element at its open end being provided with a washer, and means for retaining said washer in position, said washer having a relatively sharp edge for contacting said conical nozzle element, and means for actuating said valve element.

ALBERT R. STEPHANY.

References Cited in the file of this patent

UNITED STATES PATENTS

| Number | Name | Date |
|---|---|---|
| 968,963 | Long | Aug. 30, 1910 |
| 1,031,932 | Hoare | July 9, 1912 |
| 1,520,694 | Butler | Dec. 30, 1924 |
| 1,609,340 | Wilson | Dec. 7, 1926 |
| 1,618,349 | Olsen | Feb. 22, 1927 |
| 1,637,592 | Ryan | Aug. 2, 1927 |
| 1,638,436 | Diedrich | Aug. 9, 1927 |
| 1,838,429 | Melio | Dec. 29, 1931 |
| 1,863,712 | Byfield | June 21, 1932 |
| 1,968,779 | Johnsen | July 31, 1934 |
| 2,164,927 | Kohler | July 4, 1939 |
| 2,283,945 | Peterson | May 26, 1942 |
| 2,329,337 | Criss | Sept. 14, 1943 |
| 2,395,906 | Owens | Mar. 5, 1946 |